US012555351B2

(12) United States Patent
Liang et al.

(10) Patent No.: US 12,555,351 B2
(45) Date of Patent: Feb. 17, 2026

(54) METHOD, SYSTEM AND DEVICE FOR COPY-PASTE TAMPERED IMAGE DETECTION

(71) Applicant: MACAU UNIVERSITY OF SCIENCE AND TECHNOLOGY, Macau (CN)

(72) Inventors: Zhiyao Liang, Macau (CN); Jixiang Yang, Macau (CN); Jianqing Li, Macau (CN)

(73) Assignee: MACAU UNIVERSITY OF SCIENCE AND TECHNOLOGY, Macau (CN)

( * ) Notice: Subject to any disclaimer, the term of this patent is extended or adjusted under 35 U.S.C. 154(b) by 290 days.

(21) Appl. No.: 18/515,832

(22) Filed: Nov. 21, 2023

(65) Prior Publication Data

US 2024/0169691 A1  May 23, 2024

(30) Foreign Application Priority Data

Nov. 22, 2022  (CN) .......................... 202211473688.6

(51) Int. Cl.
*G06V 10/75* (2022.01)
*G06V 10/46* (2022.01)
(Continued)

(52) U.S. Cl.
CPC ............ *G06V 10/758* (2022.01); *G06V 10/46* (2022.01); *G06V 10/751* (2022.01);
(Continued)

(58) Field of Classification Search
None
See application file for complete search history.

(56) References Cited

U.S. PATENT DOCUMENTS 10,692,218 B2   6/2020  Wang et al.
12,249,345 B2 *  3/2025  Schalkwyk ............. G10L 25/51
(Continued)

FOREIGN PATENT DOCUMENTS

CN    103744973 A    4/2014
CN    104182973 A    12/2014
(Continued)

OTHER PUBLICATIONS

Amerini et al., "A SIFT-Based Forensic Method for Copy-Move Attack Detection and Transformation Recovery," IEEE Transactions on Information Forensics and Security, vol. 6, No. 3, Sep. 2011 1099 (Year: 2011).*

(Continued)

*Primary Examiner* — Soo Shin
(74) *Attorney, Agent, or Firm* — CANTOR COLBURN LLP

(57) ABSTRACT

A method for a copy-paste tampered image detection, including: extracting, using a scale-invariant feature transformation algorithm, key points of an image and features corresponding to the key points; constructing, using a gradient hash matching algorithm, a hash table based on the features, and putting the key points into rows corresponding to serial numbers of the hash table; performing a matching operation, using a k-nearest neighbor algorithm, on the key points in each row of the hash table to obtain key point pairs; and clustering and grouping, using a distance clustering filtering algorithm, the key point pairs, and retaining the key point pairs in a cluster group whose number of the key point pairs is greater than a quantity threshold; and marking circles in the image with each key point, in the key point pairs that are retained, as a center and according to a specified radius.

16 Claims, 3 Drawing Sheets

(51) Int. Cl.
*G06V 10/762* (2022.01)
*G06V 10/86* (2022.01)
*G06V 20/00* (2022.01)

(52) U.S. Cl.
CPC ............ *G06V 10/763* (2022.01); *G06V 10/86* (2022.01); *G06V 20/95* (2022.01)

(56) References Cited

U.S. PATENT DOCUMENTS

| | | | | |
|---|---|---|---|---|
| 2022/0329847 A1* | 10/2022 | Parashar | ............ | G06T 7/11 |
| 2023/0091912 A1* | 3/2023 | Covell | ............ | G06N 20/00 |
| | | | | 725/32 |
| 2023/0222236 A1* | 7/2023 | Devarao | ............ | G06N 3/0464 |
| | | | | 726/29 |

FOREIGN PATENT DOCUMENTS

| | | |
|---|---|---|
| CN | 105631871 A | 6/2016 |
| CN | 109902700 A | 6/2019 |
| WO | 2018120724 A1 | 7/2018 |

OTHER PUBLICATIONS

Cao et al., "A robust detection algorithm for copy-move forgery in digital images," Forensic Science International 214 (2012) 33-43 (Year: 2012).*

Ulutas et al., "Frame duplication/mirroring detection method with binary features," IET Image Process., 2017, vol. 11 Iss. 5, pp. 333-342 (Year: 2017).*

Mahmood et al., "Copy-Move Forgery Detection Technique for Forensic Analysis in Digital Images," Hindawi Publishing Corporation, Mathematical Problems in Engineering, vol. 2016, Article ID 8713202, 13 pages, http://dx.doi.org/10.1155/2016/8713202 (Year: 2016).*

Lee et al., "Detection of copy-move image forgery using histogram of orientated gradients," Information Sciences 321 (2015) 250-262 (Year: 2015).*

* cited by examiner

METHOD, SYSTEM AND DEVICE FOR COPY-PASTE TAMPERED IMAGE DETECTION

CROSS-REFERENCE TO RELATED APPLICATION

Pursuant to 35 U.S.C. § 119 and the Paris Convention, this application claims the benefit of Chinese Patent Application No. 202211473688.6 filed on Nov. 22, 2022, the content of which is incorporated herein by reference.

TECHNICAL FIELD

This disclosure relates to the field of image tampering technology, and in particular, to a method a system and a device for a copy-paste tampered image detection.

BACKGROUND

The statements provided herein are merely background information related to the present application, and do not necessarily constitute any prior arts. Image copy-paste tampering is an image tampering technique. This technique copies a certain region of an image and pastes it elsewhere in the same image. In order to make a more realistic forgery effect, the pasted region may be a certain transformation form of the copied region that has undergone certain operations. That is, before pasting, the copied region may undergo some resampling operations (such as rotation and scaling and other geometric operations) or down-sampling operations (such as JPEG compression, adding noise and image blurring). In this field, it is desired to quickly detect and mark the copied and pasted regions of the tampered image when the image has been resampled or down-sampled.

Current algorithms for the copy-paste tamper detection may be divided into three categories: a block-based algorithm, a key point-based algorithm, and a deep learning-based algorithm.

The algorithm process based on blocks is as follows: first, the image is segmented into overlapping image blocks; then, the invariant moment algorithm is utilized to extract an image feature of each image block; and then, feature matching pairs are obtained by performing a matching operation on the features of all image blocks; finally, the feature matching pairs are post-processed to filter incorrect feature matching pairs, and the copy-paste tampered region in the image is marked by the matched feature pair.

The block-based algorithm uses an invariant moment algorithm, such as a polar complex exponential transform (PCET), a polar cosine transform (PCT), Zernike moments, radial harmonic Fourier moments (RHFMs), and a discrete analytic Fourier-Mellin transform (DAFMT), to extract the features of image blocks. Since the feature extraction algorithm extracts features from fixed-size image blocks, the detection effect may not be good when facing tampered regions processed by large-scale scaling. In the meantime, the block-based algorithm divides the image into a large number of overlapping blocks, which causes the entire process to spend a lot of time and computing resources in the feature extraction and matching stages, and reduces the detection efficiency.

The algorithm process based on key points is as follows: first, a key point extraction algorithm is applied to extract key points in the image; then, the matching algorithm is utilized to match similar key points to obtain key point pairs; then, the filtering algorithm is applied to all key point pairs to filter the incorrect matching pairs and retain the correct key point pairs; finally, a matting algorithm is applied to the remaining key point pairs to mark copy-paste tampered regions in the image.

Among the existing key point-based algorithms, the key point extraction algorithm (such as a scale-invariant feature transform algorithm (SIFT) and a fast robust feature algorithm (SURF)) is geometrically invariant and is robust to noise and illumination changes. The key point extraction algorithm can extract a large number of key points in textured regions, but cannot extract enough key points for detection of tampered regions when facing smooth regions. To solve the problem that the key point extraction algorithm cannot extract a sufficient number of key points in smooth regions, the number of key points may be increased by reducing the contrast threshold of the key point extraction algorithm. However, in this way, a total number of key points will be greatly increased, thereby the calculation time for matching key point pairs will be increased and the efficiency of the tamper detection algorithm in detecting tampered regions will be reduced. Meanwhile, in the key point matching stage, increasing the number of key points will produce more incorrect key point pairs, which will increase the difficulty of the filtering algorithm in filtering the incorrect key point pairs and reduce the accuracy of detecting tampered regions.

The detection process of the deep learning-based algorithm is different from the previous two types of algorithms. The deep learning-based algorithm uses a large number of tampered images to train a convolutional neural network, and then uses the trained network to detect copy-paste tampered images. The algorithm based on deep learning is a data-dependent model algorithm. There are various types of tampered regions in copy-paste tampered images. The algorithm based on deep learning can detect the categories of tampered regions that have been marked in the training data, but cannot detect the categories of tampered regions that have not been marked in the training data. Moreover, Moreover, for copy-paste tamper detection tasks, the number of images in the public datasets is generally far from sufficient to support effective model training, compared to tasks where deep learning algorithms are widely used.

SUMMARY

In view of this, this disclosure provides a method, system and a device for a copy-paste tampered image detection to improve the accuracy and efficiency of tampering detection.

To achieve the above objectives, this disclosure provides the following solutions:

A method for a copy-paste tampered image detection is provided in accordance with this disclosure, which includes steps of: extracting, using a scale-invariant feature transformation algorithm, key points of an image to be detected and features corresponding to the key points; constructing, using a gradient hash matching algorithm, a hash table based on the features of the key points, and putting the key points into rows corresponding to serial numbers of the hash table; performing a matching operation, using a k-nearest neighbor algorithm, on the key points in each row of the hash table to obtain key point pairs; and clustering and grouping, using a distance clustering filtering algorithm, the key point pairs, and retaining the key point pairs in a cluster group whose number of the key point pairs is greater than a quantity threshold; and marking circles in the image to be detected with each key point, in the key point pairs that are retained, as a center and according to a specified radius, wherein regions within all of the circles are tampered regions of the image to be detected.

Optionally, the step of constructing, using the gradient hash matching algorithm, the hash table based on the features of the key points, and putting the key points into the rows corresponding to the serial numbers of the hash table, also includes steps that:

For each key point, setting a rectangular window with the key point as a center, and determining gradients of all pixels in the rectangular window; dividing the rectangular window into 4×4 cells, each cell comprising gradients of 16 pixels; wherein all cells and all gradients constitute the features of the key point; carrying on a statistic on the gradients in each cell to obtain a gradient histogram; and constructing a 4-dimensional blank hash table;

For each key point, selecting a gradient of a largest gradient amplitude among the 4 cells adjacent to the key point, and recording a serial number of the gradient histogram corresponding to the gradient of the largest gradient amplitude; taking the serial number as a key value of the key point in the hash table; and putting the key point into the row of the hash table corresponding to the key value.

Optionally, the step of performing the matching operation, using the k-nearest neighbor algorithm, on the key points in each row of the hash table to obtain the key point pairs also includes that:

For a key point $k_i$, selecting, based on the features of the key points, two key points $k_x$ and $k_y$ having two shortest Euclidean distances from the key point $k_i$ in a same row; wherein a Euclidean distance is calculated using the k-nearest neighbor algorithm.

Determining that the key point $k_i$ and the key point $k_x$ constitute a key point pair when $ED_{i,1}/ED_{i,2}<0.4$; wherein, $ED_{i,1}<ED_{i,2}$; $ED_{i,1}$ is the Euclidean distance between the key point $k_i$ and the key point $k_x$, $ED_{i,2}$ is the Euclidean distance between key point $k_i$ and key point $k_y$.

Optionally, a calculation formula of the Euclidean distance is expressed as:

$$ED_{a,b} = \sqrt{\sum_{j=1}^{128}(d_a^j - d_b^j)^2}$$

Where, $ED_{a,b}$ denotes the Euclidean distance between key point $k_a$ and key point $k_b$, $d_a^j$ denotes a j-th dimensional feature of the key point $k_a$, and $d_b^j$ denotes a j-th dimensional feature of the key point $k_b$.

Optionally, the step of clustering and grouping, using the distance clustering filtering algorithm, the key point pairs, and retaining the key point pairs in the cluster group whose number of the key point pairs is greater than the quantity threshold also includes that:

Constructing a distance constraint and constituting a cluster group by the key point pairs that satisfy the distance constraint;

For each cluster group, calculating a quantity mean of key point pairs in the cluster group and a corresponding standard deviation; and calculating a quantity threshold based on the quantity mean and the corresponding standard deviation;

For each cluster group, determining that, if the number of key point pairs in the cluster group is greater than the quantity threshold, all of the key point pairs in the cluster group are regarded as correctly-matched key point pairs and retaining the correctly-matched key point pairs; and determining that, if the number of key point pairs in the cluster group is smaller than or equal to the quantity threshold, all of the key point pairs in the cluster group are regarded as correctly-matched key point pairs, and deleting the correctly-matched key point pairs.

Optionally, a calculation formula of the quantity mean $\lambda$ is expressed as:

$$\lambda = \frac{1}{|GP|}\sum_{i=1}^{|GP|} m_i$$

Where, GP denotes a set of cluster groups, and $m_i$ denotes the number of key point pairs in an i-th cluster group;

A calculation formula of the standard deviation $\varepsilon$ is expressed as:

$$\varepsilon = \sqrt{\frac{1}{|GP|}\sum_{i=1}^{|GP|}(m_i - \lambda)^2}$$

A calculation formula of the quantity threshold $T_2$ is expressed as:

$$T_2 = \lambda - \varepsilon.$$

A system for a copy-paste tampered image detection is also provided in accordance with this disclosure, which includes: an extraction module, a hash table construction module, a matching module, a clustering grouping module, and a tampered region determination module.

The extraction module is configured to extract key points of an image to be detected and features corresponding to the key points by using a scale-invariant feature transformation algorithm;

The hash table construction module is configured to construct a hash table based on the features of the key points by using a gradient hash matching algorithm, and put the key points into rows corresponding to serial numbers of the hash table;

The matching module is configured to perform a matching operation on the key points in each row of the hash table by using a k-nearest neighbor algorithm to obtain key point pairs;

The clustering grouping module is configured to cluster and group the key point pairs by using a distance clustering filtering algorithm, and retain the key point pairs in a cluster group whose number of key point pairs is greater than a quantity threshold;

The tampered region determination module is configured to, in the key point pairs that are retained, mark circles in the image to be detected with each key point as a center and according to a specified radius. Regions within all circles are tampered regions of the image to be detected.

An electronic device is also provided in accordance with this disclosure, which includes a memory and a processor. The memory is configured to store a computer program. The processor is configured to, when executing the computer program, cause the electronic device to perform the method for the copy-paste tampered image detection as above-mentioned.

A computer-readable storage medium is also provided in accordance with this disclosure, in which a computer program is stored. The computer program, when executed by a processor, enables the method for the copy-paste tampered image detection as above-mentioned to be implemented.

According to the specific embodiments provided by this disclosure, the following technical effects are provided in this disclosure:

This disclosure adopts the gradient hash matching algorithm to construct a hash table, which can ensure that similar key points are correctly-matched into key point pairs while increasing the number of key points, reduce the calculation time in the matching stage, and improve detection efficiency.

This disclosure utilizes spatial characteristics of correct key point pairs and incorrect key point pairs, and adopts the distance clustering filtering algorithm to distinguish the correct and incorrect key point pairs, which can filter a large number of incorrect key point pairs while ensuring that the vast majority of correct key point pairs are retained. This filtering algorithm can improve the accuracy of tamper detection.

BRIEF DESCRIPTION OF DRAWINGS

In order to explain the embodiments of this disclosure or technical solutions in the existing technologies more clearly, the drawings that need to be used in the embodiments will be briefly introduced below. Obviously, the drawings in the following description are merely some examples of this disclosure. For persons of ordinary skill in the art, other drawings may also be obtained based on these drawings without exerting creative efforts.

FIG. 2A shows a rectangular window with a size of 16×16 set with the key point as the center, FIG. 2B shows a gradient histogram of the pixel gradient in each cell:

DETAILED DESCRIPTION OF EMBODIMENTS

The technical solutions in the embodiments of this disclosure will be clearly and comprehensively described below with reference to the drawings in the embodiments of this disclosure. Obviously, the described embodiments are merely some, rather than all of the embodiments of this disclosure. Based on the embodiments of this disclosure, all other embodiments obtained by those of ordinary skill in the art without creative efforts fall within the protection scope of this disclosure.

An objective of this disclosure is to provide a method, a system and a device for a copy-paste tampered image detection to improve the accuracy and efficiency of tampering detection.

To make the above objectives, features and advantages of this disclosure more obvious and understandable, this disclosure will be described in further detail below with reference to the accompanying drawings and specific embodiments.

Figure 1:
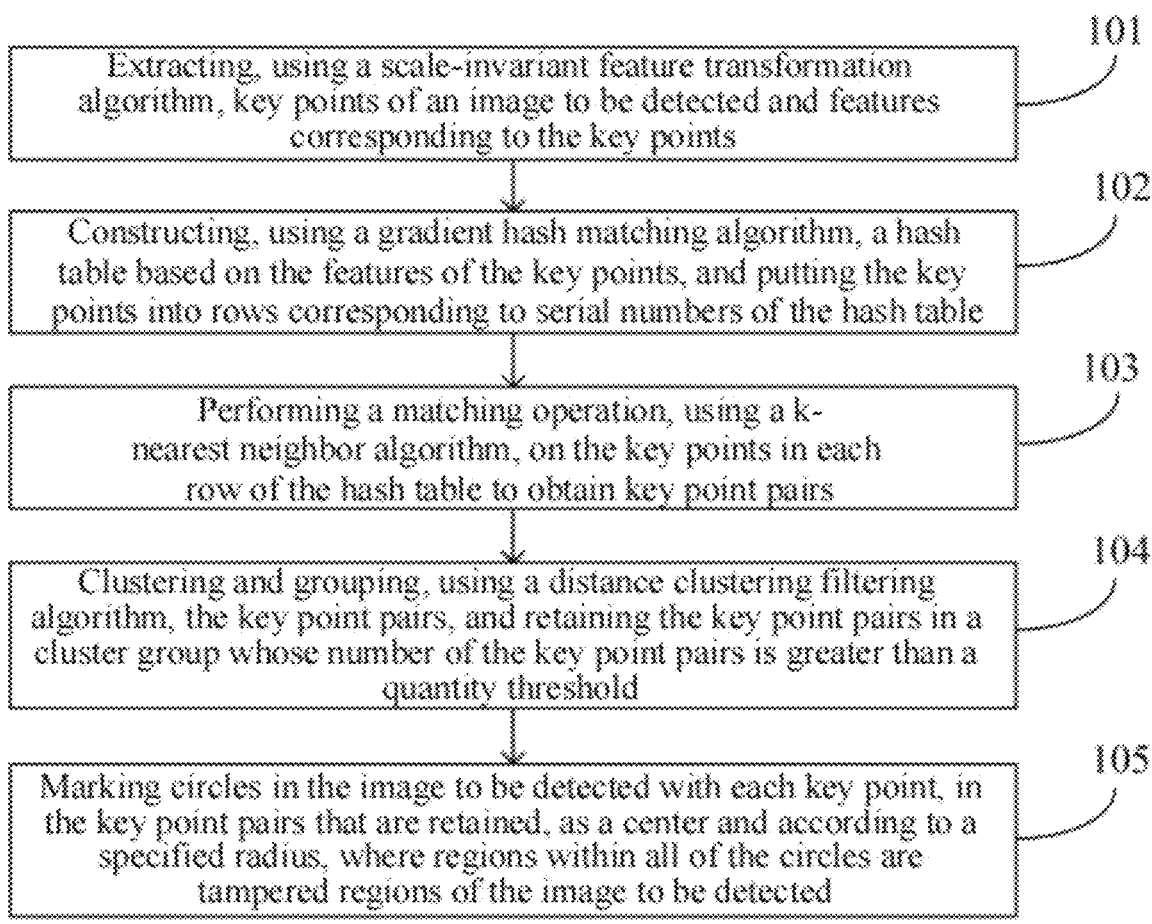
FIG. 1 is a flow chart of a method for a copy-paste tampered image detection provided by this disclosure.

As shown in FIG. 1, the method for the copy-paste tampered image detection provided by this disclosure includes the following steps 101 to 105.

In step 101, key points of an image to be detected and features corresponding to the key points are extracted by using a scale-invariant feature transformation algorithm.

Figure 2B:
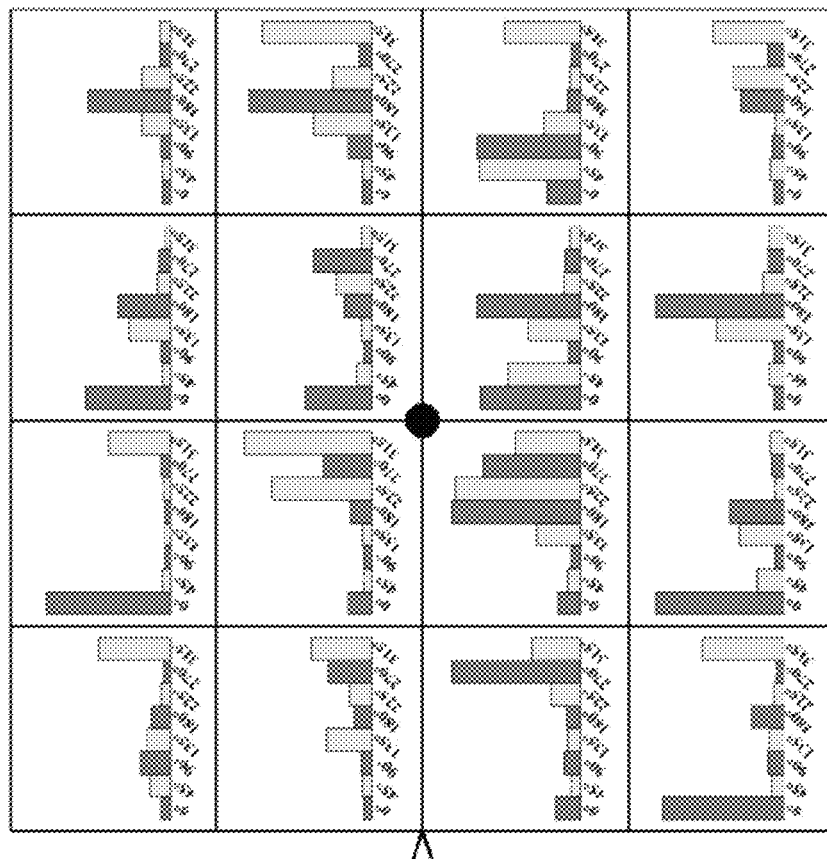
FIG. 2A and FIG. 2B are schematic diagrams of a key point feature extraction provided by this disclosure.
Figure 2A:
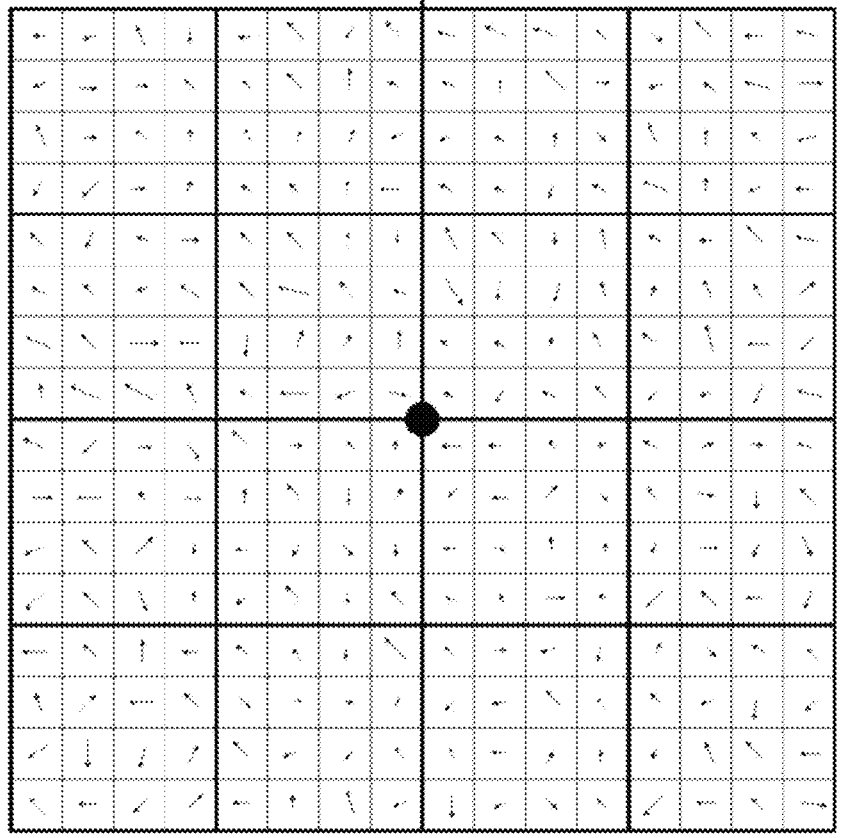

In practical applications, the scale-invariant feature transform algorithm (SIFT) having a contrast threshold of 0 is first used to extract the key points of the image and the 128-dimensional gradient features corresponding to the key points. Where, the 128-dimensional feature extracted from each key point may be vividly shown in FIG. 2. Where, the filled dot represents a key point. Firstly, as shown in FIG. 2A, a rectangular window of size 16×16 is set with the key point as the center, and the gradient of all pixels in the window is calculated. In FIG. 2A, the length of the arrow is the magnitude of the gradient, and the direction of the arrow is the direction of the gradient. Secondly, the 16×16 rectangular window is divided into 4×4 cells. Each cell consists of 16 pixels of gradient. The pixel gradients in each cell are counted to obtain a gradient histogram, as shown in FIG. 2B. In each histogram, the abscissa is the direction of the gradient, and the ordinate is the statistical value of the gradient. The 16 cells and 16 gradients of each cell constitute the 128-dimensional feature of the key point.

In step 102: a hash table is constructed based on the features of the key points by using a gradient hash matching algorithm, and putting the key points into rows corresponding to serial numbers of the hash table.

In practical applications, the gradient hash matching algorithm constructs a hash table based on characteristics of the 128-dimensional gradient features extracted by SIFT, and calculates the serial number to which the key point is corresponded in the table based on some of the gradient features of the key point as a way to put the key point into the row corresponding to the serial number.

Figure 3:
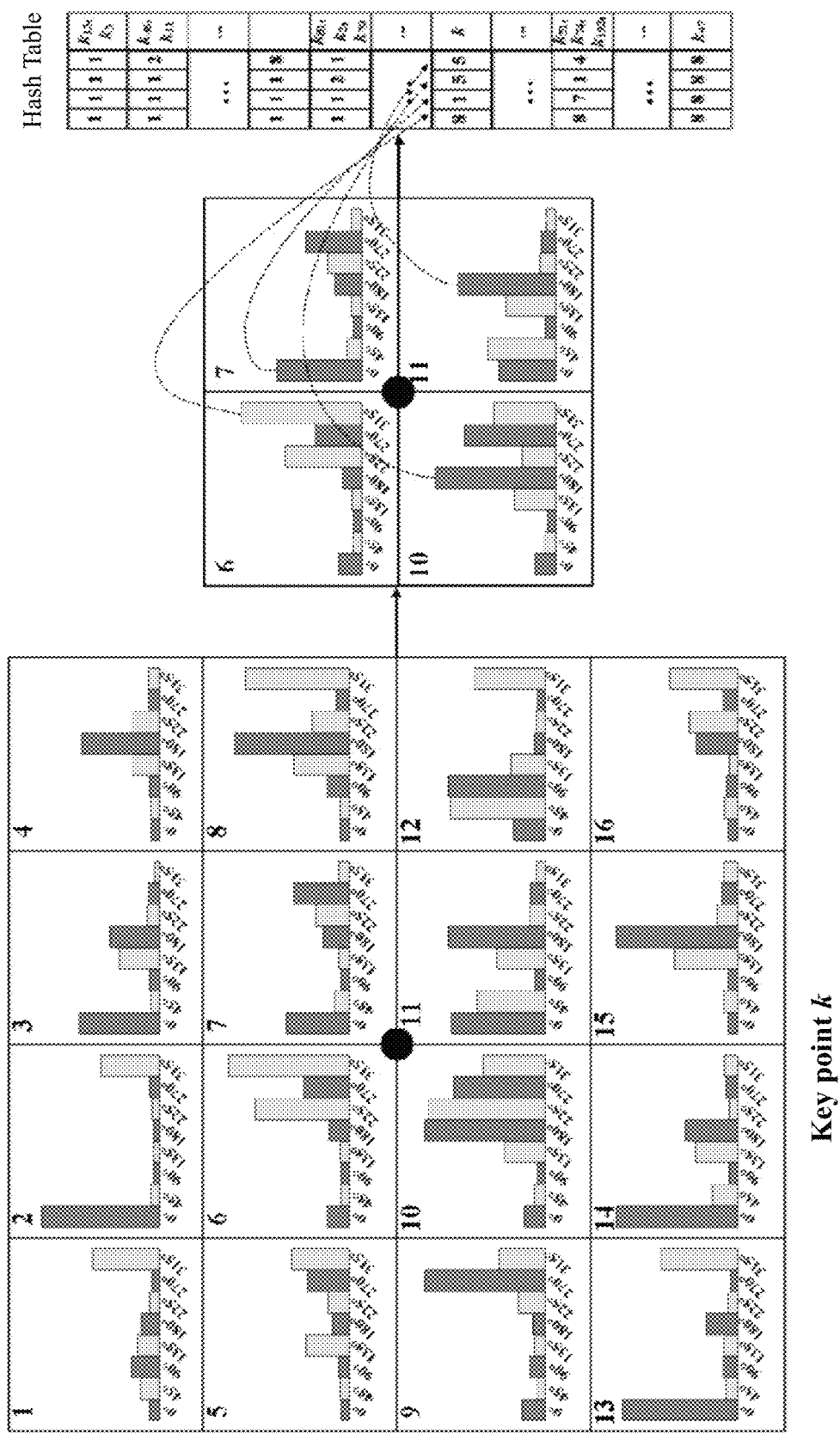
FIG. 3 is a flow chart for constructing a hash table using a gradient hash matching algorithm provided by this disclosure.

The hash table constructed by the gradient hash matching algorithm is shown in FIG. 3. First, a 4-dimensional blank hash table is built. Then, the 16 cells in step 101 are labeled in sequence. 4 cells adjacent to the key point (i.e., cells 6, 7, 10, and 11) are selected to calculate the gradient of the largest gradient amplitude in each cell, and the sequence numbers to which the gradient of the largest gradient amplitude is corresponded (such as 8, 1, 5, 5 in FIG. 3) in the histogram is recorded. The sequence numbers to which the maximum gradient amplitude is corresponded in the four histograms are utilized as a key value of the key point in the hash table, and put the key points into the rows of the hash table corresponding to the key values, respectively.

In step 103: a matching operation are performed by using a k-nearest neighbor algorithm on key points in the rows of the hash table to obtain key point pairs.

In practical applications, in each row of the hash table, the k-nearest neighbor algorithm is applied to match qualified key points into key point pairs.

In the process of matching by using the k-nearest neighbor algorithm, the 128-dimensional features of the key points are used to calculate the Euclidean distance between the two key points, as shown in formula (1):

$$ED_{a,b} = \sum_{j=1}^{128}(d_a^j - d_b^j)^2 \quad (1)$$

Where, $ED_{a,b}$ denotes the Euclidean distance between key point $k_a$ and key point $k_b$, $d_a^j$ denotes the j-th dimensional feature of key point $k_a$, and $d_b^j$ denotes the j-th dimensional feature of key point $k_b$.

In each row of the hash table, each key point needs to calculate the Euclidean distance from other key points, and then the shortest two distances are selected. For example: in each row of the hash table, firstly, distance values between key point $k_i$ and other key points are calculated, and the shortest two distance values are recorded, referred to as $ED_{i,1}$ and $ED_{i,2}$ respectively. $ED_{i,1} < ED_{i,2}$; $ED_{i,1}$ is the Euclidean distance between key point $k_i$ and key point $k_x$, $ED_{i,2}$ is the Euclidean distance between key point $k_i$ and key point $k_y$. Secondly, for the key point $k_i$, if $ED_{i,1}$ and $ED_{i,2}$ meet a condition of formula (2), then $k_i$ and $k_x$ constitute a key point pair based on $k_i$ similarity; and if $ED_{i,1}$ and $ED_{i,2}$ do not meet the condition of formula (2), then no key point pair based on $k_i$ similarity is formed.

$$ED_{i,1}/ED_{i,2} < 0.4 \quad (2)$$

In the gradient hash matching algorithm, in each row of the hash table, the distance values between each key point and other key points in the same row are calculated and matched into key point pairs. Compared with calculating the distance values between each key point and all other key points, this disclosure narrows the scope of matching and improves the speed of matching. Moreover, since the four selected cells are closest to the key points in the image space, the gradients of these four cells have the highest correlation with the key points, so that similar key points can be allocated in the same row, ensuring the accuracy of matching.

In step 104: the key point pairs are clustered and grouped by using a distance clustering filtering algorithm, and a cluster group whose number of key point pairs is greater than a quantity threshold of the key point pairs is retained.

Based on the characteristic that correct key point pairs tend to cluster together in the graph while incorrect key point pairs are scattered randomly, the distance clustering filtering algorithm is applied to cluster and group the key point pairs according to the distances between key point pairs. If the number of key point pairs in a group is greater than a specified threshold, this group will be retained, and if the number of key point pairs in the group is smaller than the specified threshold, this group will be deleted.

In practical applications, the distance clustering filtering algorithm is divided into two steps: a step of distance clustering and a step of incorrect key point pair filtering.

Before describing the distance clustering, the following definitions are provided:

Definition-1: for two given key points $k_a$ and $k_b$, the spatial coordinates thereof are set as $(x_a, y_a)$ and $(x_b, y_b)$ respectively, and $d(k_a, k_b)$ is a spatial distance between the two key points, as shown in the formula (3).

$$d(k_a,k_b) = \sqrt{(x_a-x_b)^2 + (y_a-y_b)^2} \tag{3}$$

Definition-2: $(k_i, k_i')$ and $(k_j, k_j')$ are set as the i-th and j-th key point pairs in a set of key point pairs respectively. The spatial distance between $k_i$ and $k_j$ is $d(k_i, k_j)$; the spatial distance between $k_i'$ and $k_j$ is $d(k_i', k_j)$; the spatial distance between $k_i$ and $k_j'$ is $d(k_i, k_j')$; the spatial distance between $k_i'$ and $k_j'$ is $d(k_i', k_j')$.

Definition-3: for a given image, the number of rows and columns are represented by row and col respectively. Assume the number of key points extracted from the image (step 101) is $|K|$, then the threshold $T_1$ is defined, as shown in formula (4).

$$T_1 = \sqrt{\frac{row \cdot col}{\pi |K|}} \tag{4}$$

Definition-4: distance constraint. If a key point pair is to be added to a cluster group, the key point pair needs to satisfy formula (5) for at least one key point pair in the cluster group.

$$(\min(d_{i,j}, d_{i',j'}) << T_1 \text{ and } \max(d_{i,j}, d_{i',j'}) \leq 2T_1) \text{ or}$$

$$(\min(d_{i',j}, d_{i,j'}) << T_1 \text{ and } \max(d_{i',j}, d_{i,j'}) \leq 2T_1) \tag{5}$$

In the distance clustering, firstly, a first one of the key point pairs is used to form a first cluster group. Subsequently, a subsequent key point pair, if satisfies a distance constraint of a first cluster group, is added to the first cluster group; if the subsequent key point pair does not satisfy the distance constraint of the cluster group pair, then this key point pair is utilized to individually form a cluster group. If a key point pair can satisfy the distance constraints of two or more cluster groups at the same time, in addition to adding the key point pair to one of the cluster groups, these cluster groups will be merged together to form a new cluster group.

After the step of distance clustering is completed, each key point pair is assigned to the corresponding cluster group.

For a given set of cluster groups GP, the i-th cluster group ($1 \leq i \leq |GP|$) is denoted as $gp_i$, and the pair number of the key point pairs in the cluster group is denoted as $m_i$. A quantity mean of key point pairs in a cluster group is defined as $\lambda$, and the corresponding standard deviation is $\varepsilon$ (shown in formula 6). The threshold $T_2$ is used to determine whether the key point pairs in the cluster group are incorrectly-matched key point pairs, as shown in formula 7.

$$\lambda = \frac{1}{|GP|} \Sigma_{i=1}^{|GP|} m_i, \quad \varepsilon = \sqrt{\frac{1}{|GP|} \Sigma_{i=1}^{|GP|} (m_i - \lambda)^2} \tag{6}$$

$$T_2 = \lambda - \varepsilon \tag{7}$$

If the number of key matching point pairs in a cluster group is greater than the threshold $T_1$, then all key point pairs in the cluster are regarded as correctly-matched key point pairs and will be retained. If the number of key matching point pairs in the cluster group is smaller than or equal to the threshold $T_1$, then the key point pairs are regarded as incorrectly-matched key point pairs and will be deleted.

In the image, the correctly and incorrectly matched key point pairs have different distributions. The correctly-matched key point pairs will be densely clustered together, while the incorrectly-matched key point pairs will be distributed irregularly, and the incorrectly-matched key point pairs will have only a few adjacent key point pairs. Based on the different distributions of correctly and incorrectly matched key point pairs, the distance clustering filtering algorithm can perform a well distinguishing therebetween and filter the incorrectly-matched key point pairs, thus the accuracy of the detection algorithm is improved.

In step 105: among the key point pairs that are retained, circles are marked in the image to be detected with each key point as a center and according to a specified radius; regions within all circles are tampered regions of the image to be detected.

After filtering out the incorrectly-matched key point pairs, each of the retained key point coordinates is used as a center of a circle and the distance threshold $T_1$ in formula (4) is used as a radius to draw the circle on the input image. The regions within the circles are marked as the tampered regions, and the region outside the circles is marked as an original region. All pixel values in the original region are modified to 0, and a map marked with the tampered regions is finally output.

To implement the method corresponding to the above-mentioned embodiment to achieve corresponding functions and technical effects, a system for a copy-paste tampered image detection is provided below, which includes: an extraction module, a hash table construction module, a matching module, a clustering grouping module, and a tampered region determination module.

The extraction module is configured to extract, using a scale-invariant feature transformation algorithm, key points of an image to be detected and features corresponding to the key points:

The hash table construction module is configured to construct, using a gradient hash matching algorithm, a hash table based on the features of the key points, and put the key points into rows corresponding to serial numbers of the hash table:

The matching module is configured to perform a matching operation, using a k-nearest neighbor algorithm, on the key points in each row of the hash table to obtain key point pairs:

The clustering grouping module is configured to cluster and group, using a distance clustering filtering algorithm, the key point pairs and retain the key point pairs in a cluster group whose number of key point pairs is greater than a quantity threshold:

The tampered region determination module is configured to, in the key point pairs that are retained, mark circles in the image to be detected with each key point as a center and according to a specified radius. Regions within all circles are tampered regions of the image to be detected.

An embodiment of this disclosure provides an electronic device, which includes a memory and a processor. The memory is configured to store a computer program. The processor is configured to, when executing the computer program, cause the electronic device to perform the method for the copy-paste tampered image detection as above-mentioned.

The above-mentioned electronic device may be a server.

An embodiment of this disclosure provides a computer-readable storage medium that stores a computer program. The computer program, when executed by a processor, enables the method for the copy-paste tampered image detection as above-mentioned to be implemented.

Each embodiment in this specification is described in a progressive manner. Each embodiment focuses on the differences with respect to other embodiments. For same and similar parts between various embodiments, reference may be made to each other. As for the system disclosed in the embodiments, which corresponds to the method disclosed in the embodiments, the description is relatively simple. For relevant details, references may be made to the description in the method section.

Specific examples are provided in this disclosure to illustrate the principles and implementations of the invention. The description of the above embodiments is only used to help understand the method and the core idea of the invention. The described embodiments are only some, not all of the embodiments of this disclosure. Other embodiments obtained base on the embodiments of this disclosure by those of ordinary skill in the art without exerting creative efforts shall all fall within the protection scope of this disclosure.

What is claimed is:

1. A method for a copy-paste tampered image detection, comprising:
    extracting, using a scale-invariant feature transformation algorithm, key points of an image to be detected and features corresponding to the key points:
    constructing, using a gradient hash matching algorithm, a hash table based on the features of the key points, and putting the key points into rows corresponding to serial numbers of the hash table:
    performing a matching operation, using a k-nearest neighbor algorithm, on the key points in each row of the hash table to obtain key point pairs; and
    clustering and grouping, using a distance clustering filtering algorithm, the key point pairs, and retaining the key point pairs in a cluster group whose number of the key point pairs is greater than a quantity threshold; and
    marking circles in the image to be detected with each key point, in the key point pairs that are retained, as a center and according to a specified radius, wherein regions within all of the circles are tampered regions of the image to be detected,
    wherein, said constructing, using the gradient hash matching algorithm, the hash table based on the features of the key points, and putting the key points into the rows corresponding to the serial numbers of the hash table, further comprises:
    for each key point,
        setting a rectangular window with the key point as a center, and determining gradients of all pixels in the rectangular window;
        dividing the rectangular window into 4×4 cells, each cell comprising gradients of 16 pixels; wherein all cells and all gradients constitute the features of the key point:
        carrying on a statistic on the gradients in each cell to obtain a gradient histogram:
    constructing a 4-dimensional blank hash table; and
    for each key point,
        selecting a gradient of a largest gradient amplitude among the 4 cells adjacent to the key point, and recording a serial number of the gradient histogram corresponding to the gradient of the largest gradient amplitude; taking the serial number as a key value of the key point in the hash table; and
        putting the key point into a row of the hash table corresponding to the key value.

2. The method for the copy-paste tampered image detection according to claim 1, wherein, said performing the matching operation, using the k-nearest neighbor algorithm, on the key points in each row of the hash table to obtain the key point pairs, further comprises:
    for a key point $k_i$, selecting, based on the features of the key points, two key points $k_x$ and $k_y$ respectively having a shortest Euclidean distance from the key point $k_i$ in a same row where the key point $k_i$ is located; wherein a Euclidean distance is determined by using the k-nearest neighbor algorithm;
    determining that the key point $k_i$ and the key point $k_x$ constitute a key point pair when $ED_{i,1}/ED_{i,2}<0.4$; wherein, $ED_{i,1}<ED_{i,2}$; $ED_{i,1}$ is a Euclidean distance between the key point $k_i$ and the key point $k_x$, $ED_{i,2}$ is a Euclidean distance between key point $k_i$ and key point $k_y$.

3. The method for the copy-paste tampered image detection according to claim 2, wherein a calculation formula of the Euclidean distance is expressed as:

$$ED_{a,b}=\sqrt{\sum_{j=1}^{128}(d_a^j-d_b^j)^2}$$

wherein, $ED_{a,b}$ denotes a Euclidean distance between key point $k_a$ and key point $k_b$, $d_a^j$ denotes a j-th dimensional feature of the key point $k_a$, and $d_b^j$ denotes a j-th dimensional feature of the key point $k_b$.

4. The method for the copy-paste tampered image detection according to claim 1, wherein said clustering and grouping, using the distance clustering filtering algorithm, the key point pairs, and retaining the key point pairs in the cluster group whose number of the key point pairs is greater than the quantity threshold, further comprises:
    constructing a distance constraint and constituting a cluster group by key point pairs that satisfy the distance constraint:

for each cluster group, calculating a quantity mean of the key point pairs in the cluster group and a standard deviation corresponding to the key point pairs:

calculating the quantity threshold based on the quantity mean and the standard deviation:

for each cluster group, determining that, if the number of key point pairs in the cluster group is greater than the quantity threshold, all of the key point pairs in the cluster group are regarded as correctly-matched key point pairs and retaining the correctly-matched key point pairs; and determining that, if the number of key point pairs in the cluster group is smaller than or equal to the quantity threshold, all of the key point pairs in the cluster group are regarded as correctly-matched key point pairs, and deleting the correctly-matched key point pairs.

5. The method for the copy-paste tampered image detection according to claim 4, wherein a calculation formula of the quantity mean λ is expressed as:

$$\lambda = \frac{1}{|GP|} \Sigma_{i=1}^{|GP|} m_i$$

wherein, GP denotes a set of cluster groups, $m_i$ denotes the number of key point pairs in an i-th cluster group:

a calculation formula of the standard deviation ε is expressed as:

$$\varepsilon = \sqrt{\frac{1}{|GP|} \Sigma_{i=1}^{|GP|} (m_i - \lambda)^2}$$

a calculation formula of the quantity threshold $T_2$ is expressed as:

$$T_2 = \lambda - \varepsilon.$$

6. An electronic device, comprising a memory and a processor, the memory is configured to store a computer program, and the processor is configured to, when executing the computer program, cause the electronic device to perform the method for the copy-paste tampered image detection according to claim 1.

7. The electronic device according to claim 6, wherein, said performing the matching operation, using the k-nearest neighbor algorithm, on the key points in each row of the hash table to obtain the key point pairs, further comprises:

for a key point $k_i$, selecting, based on the features of the key points, two key points $k_x$ and $k_y$ respectively having a shortest Euclidean distance from the key point $k_i$ in the same row; wherein a Euclidean distance is determined using the k-nearest neighbor algorithm:

determining that the key point $k_i$ and the key point $k_x$ constitute a key point pair when $ED_{i,1}/ED_{i,2} < 0.4$; wherein, $ED_{i,1} < ED_{i,2}$; $ED_{i,1}$ is a Euclidean distance between the key point $k_i$ and the key point $k_x$, $ED_{i,2}$ is a Euclidean distance between key point $k_i$ and key point $k_y$.

8. The electronic device according to claim 7, wherein a calculation formula of the Euclidean distance is expressed as:

$$ED_{a,b} = \sqrt{\Sigma_{j=1}^{128} (d_a^j - d_b^j)^2}$$

wherein, $ED_{a,b}$ denotes a Euclidean distance between key point $k_a$ and key point $k_b$, $d_a^j$ denotes a j-th dimensional feature of the key point $k_a$, and $d_b^j$ denotes a j-th dimensional feature of the key point $k_b$.

9. The electronic device according to claim 6, wherein said clustering and grouping using the distance clustering filtering algorithm, the key point pairs, and retaining the key point pairs in the cluster group whose number of the key point pairs is greater than the quantity threshold, further comprises:

constructing a distance constraint and constituting a cluster group by key point pairs that satisfy the distance constraint:

for each cluster group, calculating a quantity mean of the key point pairs in the cluster group and a standard deviation corresponding to the key point pairs:

calculating the quantity threshold based on the quantity mean and the standard deviation:

for each cluster group, determining that, if the number of key point pairs in the cluster group is greater than the quantity threshold, all of the key point pairs in the cluster group are regarded as correctly-matched key point pairs and retaining the correctly-matched key point pairs; and determining that, if the number of key point pairs in the cluster group is smaller than or equal to the quantity threshold, all of the key point pairs in the cluster group are regarded as correctly-matched key point pairs, and deleting the correctly-matched key point pairs.

10. The electronic device according to claim 9, wherein a calculation formula of the quantity mean λ is expressed as:

$$\lambda = \frac{1}{|GP|} \Sigma_{i=1}^{|GP|} m_i$$

wherein, GP denotes a set of cluster groups, $m_i$ denotes the number of key point pairs in an i-th cluster group;

a calculation formula of the standard deviation ε is expressed as:

$$\varepsilon = \sqrt{\frac{1}{|GP|} \Sigma_{i=1}^{|GP|} (m_i - \lambda)^2}$$

a calculation formula of the quantity threshold $T_2$ is expressed as:

$$T_2 = \lambda - \varepsilon.$$

11. A non-transitory computer-readable storage medium, in which a computer program is stored, wherein the computer program, when executed by a processor, enables the method for the copy-paste tampered image detection according to claim 1 to be implemented.

12. The non-transitory computer-readable storage medium according to claim 11, wherein, said performing the matching operation, using the k-nearest neighbor algorithm, on the key points in each row of the hash table to obtain the key point pairs, further comprises:

for a key point $k_i$, selecting, based on the features of the key points, two key points $k_x$ and $k_y$ respectively having a shortest Euclidean distance from the key point $k_i$ in the same row; wherein a Euclidean distance is determined by using the k-nearest neighbor algorithm;

determining that the key point $k_i$ and the key point $k_x$ constitute a key point pair when $ED_{i,1}/ED_{i,2} < 0.4$; wherein, $ED_{i,1} < ED_{i,2}$; $ED_{i,1}$ is a Euclidean distance between the key point $k_i$ and the key point $k_x$, $ED_{i,2}$ is a Euclidean distance between key point $k_i$ and key point $k_y$.

13. The non-transitory computer-readable storage medium according to claim 12, wherein a calculation formula of the Euclidean distance is expressed as:

$$ED_{a,b}=\sqrt{\Sigma_{j=1}^{128}(d_a^j-d_b^j)^2}$$

wherein, $ED_{a,b}$ denotes a Euclidean distance between key point $k_a$ and key point $k_b$, $d_a^j$ denotes a j-th dimensional feature of the key point $k_a$, and $d_b^j$ denotes a j-th dimensional feature of the key point $k_b$.

14. The non-transitory computer-readable storage medium according to claim 11, wherein said clustering and grouping, using the distance clustering filtering algorithm, the key point pairs, and retaining the key point pairs in the cluster group whose number of the key point pairs is greater than the quantity threshold, further comprises:
constructing a distance constraint and constituting a cluster group by key point pairs that satisfy the distance constraint:
for each cluster group, calculating a quantity mean of the key point pairs in the cluster group and a standard deviation corresponding to the key point pairs:
calculating the quantity threshold based on the quantity mean and the standard deviation:
for each cluster group, determining that, if the number of key point pairs in the cluster group is greater than the quantity threshold, all of the key point pairs in the cluster group are regarded as correctly-matched key point pairs and retaining the correctly-matched key point pairs; and determining that, if the number of key point pairs in the cluster group is smaller than or equal to the quantity threshold, all of the key point pairs in the cluster group are regarded as correctly-matched key point pairs, and deleting the correctly-matched key point pairs.

15. The non-transitory computer-readable storage medium according to claim 14, wherein a calculation formula of the quantity mean $\lambda$ is expressed as:

$$\lambda = \frac{1}{|GP|}\Sigma_{i=1}^{|GP|} m_i$$

wherein, GP denotes a set of cluster groups, $m_i$ denotes the number of key point pairs in an i-th cluster group:
a calculation formula of the standard deviation $\varepsilon$ is expressed as:

$$\varepsilon = \sqrt{\frac{1}{|GP|}\Sigma_{i=1}^{|GP|}(m_i - \lambda)^2}$$

a calculation formula of the quantity threshold $T_2$ is expressed as:

$$T_2 = \lambda - \varepsilon.$$

16. A system for a copy-paste tampered image detection, comprising:
an extraction module, configured to extract, using a scale-invariant feature transformation algorithm, key points of an image to be detected and features corresponding to the key points:
a hash table construction module, configured to construct, using a gradient hash matching algorithm, a hash table based on the features of the key points, and put the key points into rows corresponding to serial numbers of the hash table:
a matching module, configured to perform a matching operation, using a k-nearest neighbor algorithm, on the key points in each row of the hash table to obtain key point pairs:
a clustering grouping module, configured to cluster and group, using a distance clustering filtering algorithm, the key point pairs, and retain the key point pairs in a cluster group whose number of the key point pairs is greater than a quantity threshold; and
a tampered region determination module, configured to, in the key point pairs that are retained, mark circles in the image to be detected with each key point as a center and according to a specified radius, wherein regions within all circles are tampered regions of the image to be detected,
wherein the hash table construction module is configured to construct, using the gradient hash matching algorithm, the hash table based on the features of the key points, and put the key points into the rows corresponding to the serial numbers of the hash table further comprises that the hash table construction module is further configured to:
for each key point,
set a rectangular window with the key point as a center, and determine gradients of all pixels in the rectangular window:
divide the rectangular window into 4×4 cells, each cell comprising gradients of 16 pixels; wherein all cells and all gradients constitute the features of the key point:
carry on a statistic on the gradients in each cell to obtain a gradient histogram:
construct a 4-dimensional blank hash table; and
for each key point,
select a gradient of a largest gradient amplitude among the 4 cells adjacent to the key point, and record a serial number of the gradient histogram corresponding to the gradient of the largest gradient amplitude: take the serial number as a key value of the key point in the hash table; and
put the key point into the row of the hash table corresponding to the key value.

* * * * *